(12) United States Patent
Kawai et al.

(10) Patent No.: US 6,927,893 B2
(45) Date of Patent: Aug. 9, 2005

(54) ELECTROPHORETIC DEVICE

(75) Inventors: Hideyuki Kawai, Suwa (JP); Masaya Ishida, Suwa (JP)

(73) Assignee: Seiko Epson Corporation (JP)

( * ) Notice: Subject to any disclaimer, the term of this patent is extended or adjusted under 35 U.S.C. 154(b) by 12 days.

(21) Appl. No.: 10/666,720

(22) Filed: Sep. 18, 2003

(65) Prior Publication Data

US 2004/0061921 A1 Apr. 1, 2004

Related U.S. Application Data

(62) Division of application No. 10/081,747, filed on Feb. 22, 2002, now Pat. No. 6,654,159.

(30) Foreign Application Priority Data

| Feb. 22, 2001 | (JP) | .................................... 2001-046095 |
| Feb. 21, 2002 | (JP) | .................................... 2002-045244 |

(51) Int. Cl.[7] .................. G02B 26/00; G09B 3/34; H01B 3/20; G03G 17/04
(52) U.S. Cl. .................. 359/296; 345/107; 430/35; 252/572
(58) Field of Search ................ 359/296, 254, 359/316; 345/107, 108, 111; 264/4.1, 4.3; 430/35; 252/572

(56) References Cited

U.S. PATENT DOCUMENTS

| 6,392,786 | B1 | 5/2002 | Albert ........................ 359/296 |
| 6,400,492 | B1 | 6/2002 | Morita et al. ............... 359/296 |
| 6,542,284 | B2 | 4/2003 | Ogawa ....................... 359/296 |
| 6,654,159 | B2 * | 11/2003 | Kawai et al. ............... 359/296 |
| 2002/0149835 | A1 | 10/2002 | Kanbe ........................ 359/296 |
| 2003/0058521 | A1 | 3/2003 | Kawai ........................ 359/296 |
| 2003/0063369 | A1 | 4/2003 | Kawai ........................ 359/296 |
| 2003/0067666 | A1 | 4/2003 | Kawai ........................ 359/296 |
| 2003/0086149 | A1 | 5/2003 | Kawai ........................ 359/296 |

* cited by examiner

*Primary Examiner*—Georgia Epps
*Assistant Examiner*—Jack Dinh
(74) *Attorney, Agent, or Firm*—Harness, Dickey & Pierce, P.L.C.

(57) ABSTRACT

In order to form an electrophoretic layer containing microcapsules at a desired region readily and accurately, a region having lyophobicity is formed on a member, and a microcapsule dispersion is then applied onto the member.

15 Claims, 11 Drawing Sheets

ELECTROPHORETIC DEVICE

CROSS REFERENCE TO RELATED APPLICATION

This application is a divisional patent application of U.S. Ser. No. 10/081,747 filed Feb. 22, 2002 now U.S. Pat. No. 6,654,159.

TECHNICAL FIELD

The present invention relates to an electrophoretic device and methods for manufacturing the same.

BACKGROUND ART

Figure 11:
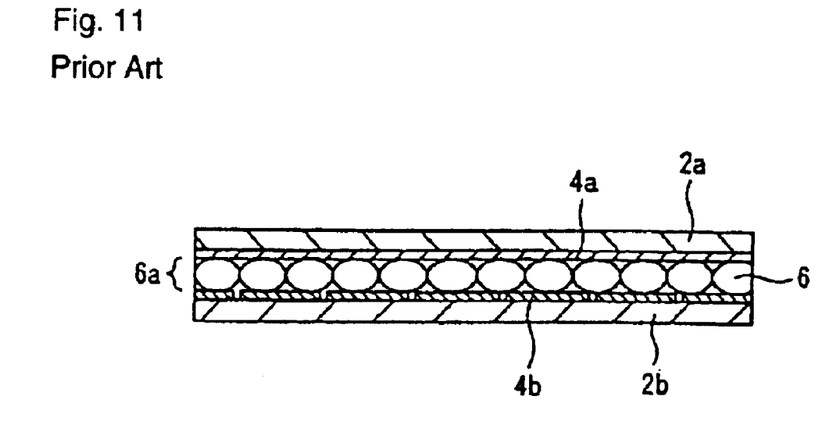
FIG. 11 is an illustration showing a configuration of an exemplary electrophoretic display in outline.

An electrophoretic display shown in FIG. 11 is known as an electrophoretic device. At least one of substrates 2a and 2b, for example, 2a, is transparent. The transparent substrate 2a has a transparent electrode 4a thereunder and the substrate 2b has an electrode layer 4b thereon, wherein the electrode layer 4b is patterned to have segments each having, for example, a proper shape and size. An electrophoretic microcapsule layer 6a is placed between the transparent substrate 2a and the transparent electrode layer 4b, wherein microcapsules 6 containing a colored dispersion medium having, for example, a black color and charged white pigment particles which function as electrophoretic particles and are dispersed in the dispersion medium are uniformly applied onto the electrophoretic microcapsule layer 6a. For example, when the transparent electrode 4a is grounded and positive or negative voltage is selectively applied to each segment of the electrode layer 4b, a desired image is displayed.

For example, an electrophoretic display using such microcapsules is manufactured according to the following procedure.

The microcapsules 6 containing an electrophoretic dispersion in which pigment particles are dispersed in a colored dispersion medium are prepared. The microcapsules 6 are dispersed in another appropriate dispersion medium to prepare a coating solution. The coating solution is then applied onto a surface of the substrate 2b on which the electrode layer 4b is disposed. The applied coating solution is dried to form the electrophoretic microcapsule layer 6a. The transparent electrode 4a and the transparent substrate 2a are laminated on the electrophoretic microcapsule layer 6a. Thus, the electrophoretic microcapsule layer 6a is disposed between the two substrates 2a and 2b having the transparent electrode 4a and the electrode layer 4b, respectively.

Peripheral circuits such as driving circuits and control circuits and switching elements for selectively supplying voltage to each of the segments of the electrode layer 4b may be mounted to the substrates 2b having the electrode layer 4b.

Regions for not applying the microcapsules 6 are situated, wherein the regions include portions functioning as electrical contacts between the substrates 2a and 2b and other portions functioning as the peripheral circuits.

As described above, various methods for selectively applying the microcapsules 6 have been proposed, and another method for further selectively applying microcapsules readily and accurately is desired.

The present invention has been developed to solve the above conventional problems. It is an object of the present invention to provide a method for manufacturing an electrophoretic device for selectively forming an electrophoretic layer at a desired region readily and accurately and to provide another method for manufacturing an electronic device using the same.

According to the present invention, in order to accomplish the object, in a first method for manufacturing an electrophoretic device in which an electrophoretic layer including microcapsules containing an electrophoretic dispersion is disposed between two electrodes, the method has the steps of forming lyophobic layers having lyophobicity for the microcapsule dispersion in which the microcapsules are dispersed at desired regions of a member; and applying the microcapsule dispersion onto the member having the lyophobic layers.

In a second method for manufacturing an electrophoretic device according to the present invention, the lyophobic layer on a region used as an electrical contact among the regions has such a thickness that conductivity is obtained in the first method.

In the first and second method for manufacturing an electrophoretic device according to the present invention, the lyophobic layer having lyophobicity for the microcapsule dispersion is formed at a desired region of a member for forming an electrophoretic layer by attaching the microcapsule dispersion in which microcapsules are dispersed, wherein the member is, for example, an electrode. The microcapsule dispersion is then applied onto the member.

Since the lyophobic layer has lyophobicity for the microcapsule dispersion, a microcapsule dispersion portion located on the lyophobic layer is repelled to migrate to another area not having the lyophobic layer; hence the microcapsule dispersion is selectively attached on the member.

In the above state, the lyophobic layer remains on the member. When the region having the lyophobic layer is used as an electrical contact later, the lyophobic layer on the region has such a thickness that conductivity is obtained. Thus, if the region having the lyophobic layer is used as an electrical contact in the state that the lyophobic layer is formed, there are not any problems.

According to the present invention, in a third method for manufacturing an electrophoretic device in which an electrophoretic layer including microcapsules containing an electrophoretic dispersion is disposed between two electrodes, the method has the steps of forming lyophilic layers having lyophilicity for the microcapsule dispersion in which the microcapsules are dispersed at desired regions of a member; and applying the microcapsule dispersion onto the member having the lyophilic layers.

In the third method for manufacturing an electrophoretic device according to the present invention, the lyophilic layer having lyophilicity for the microcapsule dispersion is formed at a desired region of a member for forming an electrophoretic layer by bonding the microcapsule dispersion in which microcapsules are dispersed, wherein the member is, for example, an electrode. The microcapsule dispersion is then applied onto the member.

Since the lyophilic layer has lyophilicity for the microcapsule dispersion, a microcapsule dispersion portion remains on the lyophilic layer. Another microcapsule dispersion portion located on an area not having the lyophilic layer gravitates toward the lyophilic layer. Subsequently, the microcapsule dispersion portion is selectively applied onto the region having the lyophilic layer.

In the fourth method for manufacturing an electrophoretic device according to the present invention, the microcapsule dispersion contains a binder according to any one of the first to third methods for manufacturing an electrophoretic device of the present invention.

In the fourth method for manufacturing an electrophoretic device according to the present invention, since the microcapsule dispersion containing dispersed microcapsules therein further contains a binder, the binder causes the microcapsules to bond to the member surely.

In the fifth method for manufacturing an electrophoretic device according to the present invention, a migration-promoting operation for promoting migration of the microcapsule dispersion on the member is performed while or after applying the microcapsule dispersion onto the member according to any one of the first to fourth methods for manufacturing an electrophoretic device of the present invention.

In the fifth method for manufacturing an electrophoretic device according to the present invention, while or after applying the microcapsule dispersion onto the member or in both states, a migration-promoting operation for promoting migration of the microcapsule dispersion on the member is performed as follows: the member is vibrated in the back, forth, right, and left directions, or inclined, or an air flow is applied. Thus, the microcapsule dispersion portion applied onto the member is ready to migrate to an area not having the lyophobic layer or a region having the lyophilic layer; hence the microcapsule dispersion is applied even more surely and selectively.

According to the present invention, in the sixth method for manufacturing an electrophoretic device in which electrophoretic particles contained in microcapsules migrate in response to voltage applied from electrodes, the method has the steps of forming lyophobic layers having lyophobicity for the microcapsule dispersion in which the microcapsules are dispersed at desired regions of a member; and applying the microcapsule dispersion onto the member having the lyophobic layers.

In the seventh method for manufacturing an electrophoretic device according to the present invention, the lyophobic layer on a region used as an electrical contact among the regions has such a thickness that conductivity is obtained in the first method.

According to the present invention, in the eighth method for manufacturing an electrophoretic device in which electrophoretic particles contained in microcapsules migrate in response to voltage applied from electrodes, the method has the steps of forming lyophilic layers having lyophilicity for the microcapsule dispersion in which the microcapsules are dispersed at desired regions of a member; and applying the microcapsule dispersion onto the member having the lyophilic layers.

In the ninth method for manufacturing an electrophoretic device according to present invention, the microcapsule dispersion contains a binder according to any one of the sixth to eight methods for manufacturing an electrophoretic device of the present invention.

In the tenth method for manufacturing an electrophoretic device according to the present invention, a migration-promoting operation for promoting migration of the microcapsule dispersion on the member is performed while or after applying the microcapsule dispersion onto the member according to any one of the sixth to ninth methods for manufacturing an electrophoretic device of the present invention.

In the sixth to tenth methods for manufacturing an electrophoretic device of the present invention, the same effects as those of the first to fifth methods for manufacturing an electrophoretic device of the present invention is obtained.

According to the present invention, in a method for manufacturing an electronic device having an electrophoretic device, the method has the steps of forming wiring comprising a conductive material on a substrate, and manufacturing the electrophoretic device by the method for manufacturing an electrophoretic device according to any one of claims 1 to 10.

The method for manufacturing an electronic device of the present invention includes the step of manufacturing an electrophoretic device by the method for manufacturing an electrophoretic device according to the present invention. Thus, an electronic device having an electrophoretic device in which a microcapsule dispersion is readily selectively applied is obtained.

DESCRIPTION OF THE PREFERRED EMBODIMENTS

Embodiments of the present invention will now be described with reference to the drawings.

Figure 1A:
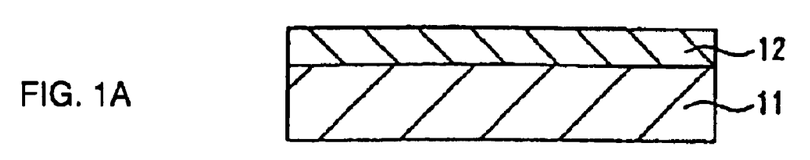
FIG. 1 is a sectional view showing a portion of a process for manufacturing an electrophoretic display according to the present invention.

As shown in FIG. 1(a), an electrode layer 12 having, for example, a plurality of segmented electrodes, a TFT (Thin Film Transistor), and the like is formed on a substrate 11 in accordance with a known procedure.

Figure 1B:
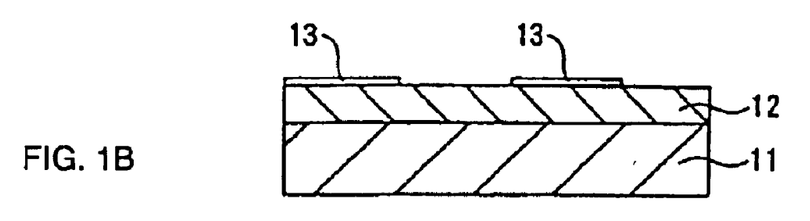

As shown in FIG. 1(b), hydrophilic treatment or water-repellent treatment is performed for the electrode layer 12 (member). For example, when performing water-repellent treatment, water-repellent layers 13 functioning as water-repellent portions, are formed at regions for not disposing microcapsules, that is, regions for not disposing microcapsule layers, on the electrode layer 12.

The water-repellent layer 13 is formed by performing reaction or adsorption of a material having a hydrophobic group in a vapor or liquid phase process on the surface of the electrode layer 12, that is, by making a self-assembled layer.

The self-assembled layer is a monolayer formed as follows: a compound having a functional group capable of bonding to an atom included in a surface of the self-assembled layer is caused to coexist with the surface for forming a layer; the functional group is adsorbed onto the layer-forming surface to bond to the atom included in the layer-forming surface; and a monolayer is formed in the state in which molecules face outward. The monolayer is referred to as a self-assembled layer because the monolayer is formed by spontaneous chemical adsorption of compounds onto a surface for forming a layer.

A compound having the functional group includes, for example, alkoxysilane compounds disclosed in Japanese Unexamined Patent Application Publication No. 62-178903 and aminosilane compounds having fluorine disclosed in Japanese Unexamined Patent Application Publication No. 63-296002.

When a region for not disposing microcapsules is used as an electrical contact, the water-repellent layer 13 comprising a water-repellent material has a sufficiently small thickness in order to obtain electric conductivity, that is, to obtain electrical contact through the water-repellent layer 13. The thickness is preferably 0.5 to 2 [nm].

The water-repellent layer 13 may not be a self-assembled layer and a monolayer. However, those are effective in obtaining the sufficiently thin water-repellent layer 13 in order to use the region for not disposing microcapsules as an electrical contact.

When performing hydrophilic treatment, hydrophilic layers (lyophilic layers) are formed at (6) areas for disposing microcapsules, that is, areas for disposing microcapsule layers, on the electrode layer 12. The lyophilic layers allow a compound having a hydrophilic group such as a hydroxyl group, a carboxyl group, or a sulfo group to react or to be adsorbed in a vapor or liquid phase process.

By performing the water-repellent treatment, as shown in FIG. 1(b), the water-repellent layers 13 are formed on the areas for not disposing microcapsule layers on the electrode layer 12.

Figure 1C:
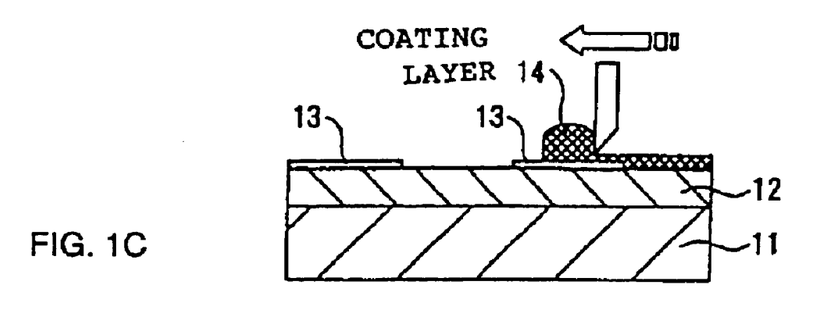

As shown in FIG. 1(c), a coating solution (microcapsule dispersion) 14 in which microcapsules are dispersed in water is uniformly applied onto the electrode layer 12, on which the water-repellent layers 13 are formed, by a knife coating method. Besides the knife coating method, a full coating method such as a roll coating method or a spin coating method may be used.

When the coating solution 14 contains a water-soluble binder, microcapsules are further rigidly fixed to electrode layer 12.

The water-soluble binder includes, for example, water-soluble polymers such as polyvinyl alcohol, polyethylene glycol, and nitrocellulose or an emulsion in which polymers such as silicon compounds, acrylic compounds, and urethane compounds are dispersed in water.

Figure 2A:
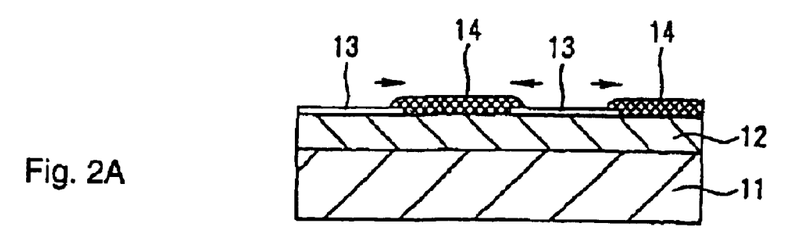
FIG. 2 is a continuation of FIG. 1.
Figure 2B:
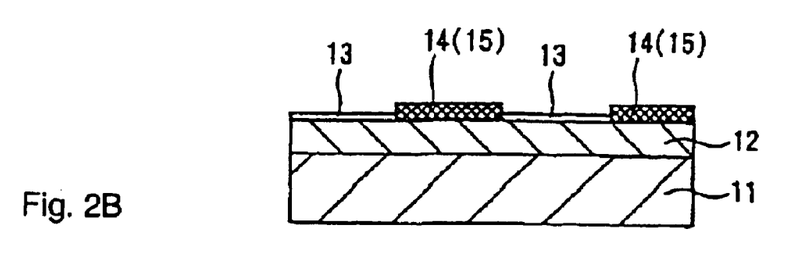

As shown in FIG. 2(a), when the water-repellent layers 13 are formed, the coating solution 14 applied onto the water-repellent layer 13 is repelled to migrate to a region where each water-repellent layer 13 is not formed. As shown in FIG. 2(b), since the water-repellent layer 13 lies at a region for not disposing a microcapsule layer, the coating solution on the water-repellent layer 13 is repelled to migrate to the region for not disposing a microcapsule layer. Subsequently, the coating solution 14 is selectively applied onto the electrode layer 12, that is, the microcapsule layer 15 is selectively formed.

When the hydrophilic layer lies at an area for disposing a microcapsule layer, the coating solution applied onto a region where the hydrophilic layer is not formed is drawn by the hydrophilic layer to migrate to the area where the hydrophilic layer is formed. Since the hydrophilic layer lies at the area for disposing a microcapsule layer, the coating solution on a region where the hydrophilic layer does not lie migrates to the area for disposing a microcapsule layer. In this case, the coating solution is also selectively applied onto the electrode layer 12 to form the microcapsule layer 15.

Figure 3A:
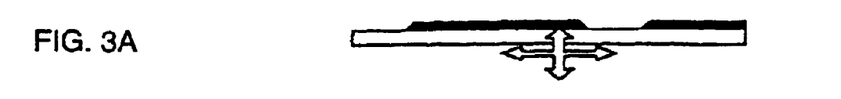
FIG. 3 is an illustration showing actions in operation for promoting the migration of a microcapsule dispersion.
Figure 3B:
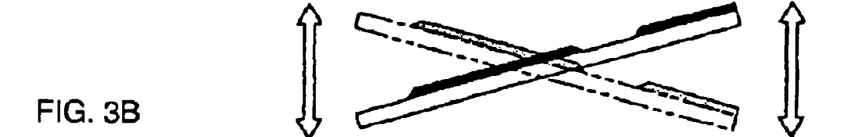
Figure 3C:
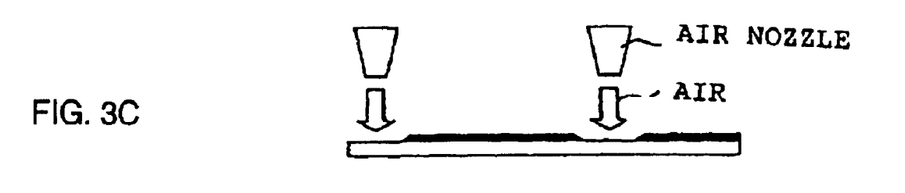

The migration of the microcapsule dispersion on the electrode layer 12 is promoted by the following operations: as shown in FIG. 3, a base material including the substrate 11 and the electrode layer 12 is vibrated in the back, forth, right, and left directions (FIG. 3(a)), or inclined (FIG. 3(b)), or an air flow is applied to an area where the water-repellent layer 13 lies, that is, an area where the microcapsule layer is not disposed, in the step of applying the coating solution 14 onto the electrode layer 12 or before the step of drying the applied coating solution 14. That is, the microcapsule dispersion on the water-repellent area for not disposing the microcapsule layer surely migrates to a region for disposing the microcapsule layer. Accordingly, the coating solution 14 can be prevented from remaining at the water-repellent area.

Drying may be started after confirming that the coating solution 14 does not remain at the water-repellent area.

Figure 2C:
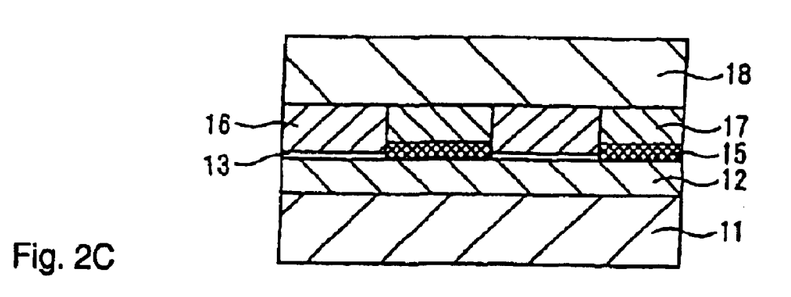

As described above, the microcapsule layers 15 are selectively disposed as shown in FIG. 2(b), and contacts for making electrical contact between upper and lower electrodes and peripheral circuit, etc. non-microcapsule layers 15 are then formed, as shown in FIG. 2(c), according to needs. A transparent substrate 18 having a transparent electrode 17 thereunder is then placed on the above structure by a known method such that the transparent electrode 17 and the microcapsule layer 15 face each other. The transparent electrode 17 includes an ITO layer which is transparent and has high conductivity, and the transparent substrate 18 is composed of glass, quartz, or plastic (synthesized resins).

As a result, a layered product having the following structure is obtained: the microcapsule layer 15 is sandwiched between the electrode layer 12 and transparent electrode 17 which both lie between the substrates 11 and 18. The layered product functions as an electrophoretic device.

The above method uses the differences of hydrophilic properties between the coating solution's 14 hydrophilic region and nonhydrophilic region and the differences of water-repelling properties between the coating solution's 14 water-repellent region and non-water-repellent region. Thus, the coating solution 14 is selectively applied onto a region for disposing the microcapsule layer 15 readily.

Since the coating solution 14 containing microcapsules is selectively applied onto a region for disposing the microcapsule layer 15, the microcapsule layer 15 can be readily formed and the apparatus for manufacturing the electrophoretic device is not complicated when the application of the coating solution 14, which is a microcapsule dispersion, is performed by a full coating method such as a knife coating method, a roll coating method, or a spin coating method.

Since the water-repellent layer 13 or the hydrophilic layer can be automatically prepared, the microcapsule layers 15 can be automatically prepared without manpower.

The electrode layer 12 is disposed on the water-repellent layer 13 and other layers are disposed thereon. When the non-microcapsule layer 16, which is a region for not disposing the microcapsule layer 15, is used as an electrical contact, the water-repellent layer 13 placed under the non-microcapsule layer 16 is designed to have such a thickness that electrical contact is obtained; thereby causing no problem. When the hydrophilic layer is formed to dispose the microcapsule layer 15 selectively, the electrical contact may be provided at a region not having a hydrophilic layer. In such a case, the electrical contact may be provided above the region not having a hydrophilic layer through a layer capable of making electrical contact.

In the above embodiment, a method, in which microcapsules are dispersed in water and the water-repellent layer 13 or the hydrophilic layer is formed, is described. The present invention is not limited to the method. A water-repellent layer having water-repellency for a coating solution or a hydrophilic layer having hydrophilicity for a coating solution may be used as well as water.

In the above embodiment, a method, in which microcapsules are dispersed in water and the water-repellent layer 13 to function as a water-repellent film and the hydrophilic layer to function as a hydrophilic film is formed, is described. For example, microcapsules may be dispersed in an organic solvent. In such a case, a lyophilic layer having lyophilicity for organic solvents or a lyophobic layer having lyophobicity for organic solvents may be formed. That is, a lyophilic layer having lyophilicity for a coating solution in which microcapsules are dispersed or a lyophobic layer having lyophobicity for the coating solution, may be formed.

In the above embodiment, an electrophoretic display to which the present invention is applied is described. The present invention may be applicable to an electrophoretic rewritable sheet and the like using an electrophoretic device.

In the above embodiment, a structure in which the microcapsule layer 15 is sandwiched between the electrode layer 12 and the transparent electrode 17 is described. Another layer such as a dielectric layer including a dielectric material may be placed between the electrode layer 12, the transparent electrode 17, and the microcapsule layer 15. Thus, the memory-storing property of the microcapsule layer 15 can be improved by providing the dielectric layer.

By the manufacturing method of the above embodiment and according to the following procedures, microcapsule layers were formed and the surface contact resistance was measured.

A titanium oxide white pigment and a surfactant were ultrasonically dispersed in a colored dispersion medium containing dodecylbenzene and an anthraquinone blue pigment to prepare an electrophoretic dispersion medium.

The electrophoretic dispersion medium was then formed into microcapsules by complex coacervation of gelatin-gum arabic. Emulsification was performed such that microcapsules having an average diameter of about 50 $\mu$m were formed.

The microcapsules and a binder containing a silicone resin were mixed at a 1:2 ratio by weight, and a slurry coating solution containing 50% by weight of water was then prepared. The coating solution was agitated with a planetary mixer for defoaming just before applying.

A PET (polyethylene terephthalate) film having ITO transparent electrodes and a thickness of 200 $\mu$m was used as a base material onto which the microcapsules were applied, wherein the ITO transparent electrodes were formed by sputtering on a surface of the PET film.

For 72 hours at room temperature by a CVD method, a self-assembled layer functioning as a water-repellent layer and having a fluoroalkylsilyl group ($CF_3(CF_2)_7(Ch_2)_2Si$—) was formed on the entire surface of the PET film on which the ITO transparent electrodes were disposed. Heptadecafluorotetrahydrodecyltrimethoxysilane was used as a raw material. In the self-assembled layer, the straight chain molecule has the fluoroalkylsilyl group ($CF_3(CF_2)_7(Ch_2)_2$ Si—) as a terminal group; hence the self-assembled layer is water-repellent.

The surface of the PET film was irradiated with a UV ray having a wavelength of 172 nm for 20 minutes in a partially masked manner, wherein the surface had the ITO transparent electrodes thereon and was entirely covered with the water-repellent layer. Thus, regional monolayers irradiated with the UV ray peel and water-repellent layers remain at the masked regions. The water-repellent layers function as water-repellent regions and other regions are not water-repellent.

The coating solution was applied onto the ITO transparent electrode surface of the PET film with a doctor blade to form a wet film having a thickness of about 150 $\mu$m, and the surface had water-repellent regions and non-water-repellent regions.

A coating solution on each non-water-repellent region remains and another coating solution applied onto each water-repellent layer was repelled and migrated to the non-water-repellent region. Notable repelling effects were obtained by vibrating or inclining the film or blowing air on the water-repellent region with a syringe.

The PET film onto which the coating solution was applied was left untouched for two hours at room temperature to dry the coating layer. During drying, a coating solution located on a non-water-repellent region by migration did not return to a water-repellent region.

After drying the coating layer as described above, the surface contact resistance was measured by disposing probes on the water-repellent region at intervals of 1 cm. It was then shown that the coating layer had a resistance of 1 k$\Omega$ or less, that is, an excellent electrical contacting property.

In the above embodiment, the microcapsule layer 15 is placed between the electrode layer 12 and the transparent electrode 17, and the present invention is not limited to the embodiment. Electrodes for applying voltage to the microcapsule layer 15 may be disposed such that the electrodes form a right angle.

The electrode layer 12 and the transparent electrode 17 having an insulating layer therebetween may be disposed on the same substrate such that charged pigments in the microcapsules migrate in parallel to the substrate.

In the above embodiment, the present invention is applied to an electrophoretic device. The present invention is not limited to the embodiment and may be applied to other electronic devices. The present invention may be applied to a method for forming various switching elements such as thin-film diodes, which are nonlinear elements, and applied to a substrate having the switching elements.

Exemplary electronic devices such as mobile personal computers, cellular phones, digital still cameras, electronic books, electronic sheets, electronic notes, and electrophoretic displays comprising an electronic sheet will now be described with reference to FIGS. 4 to 10.

Figure 4:
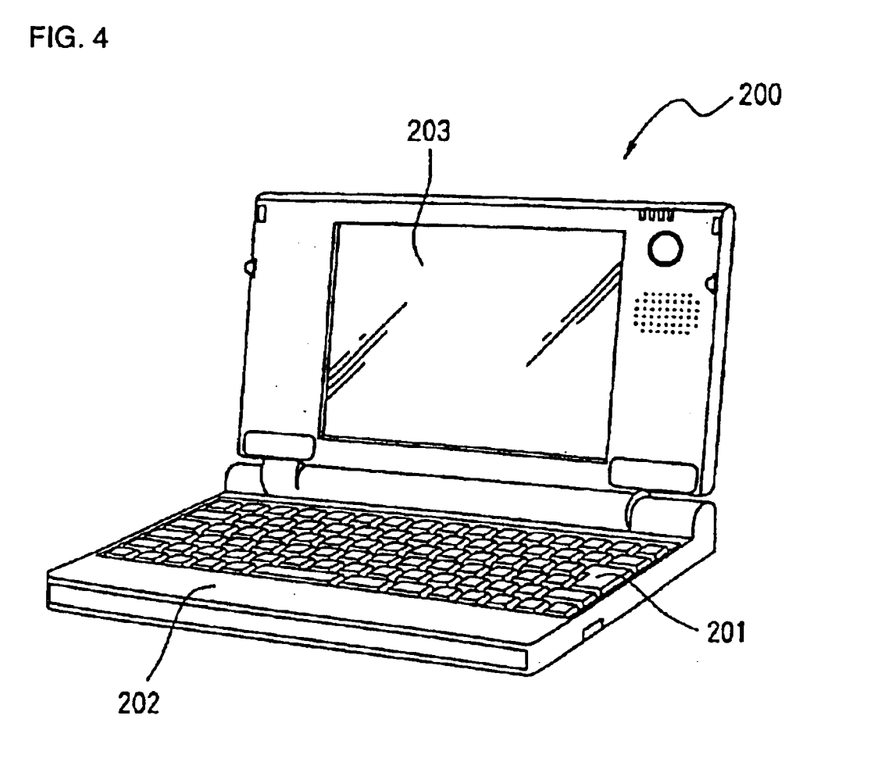
FIG. 4 is a perspective view showing a configuration of a mobile personal computer.

FIG. 4 is a perspective view showing a configuration of a personal computer.

A personal computer 200 has a display unit 203 and a main body 202 comprising a keyboard 201. In the personal computer 200, the display unit 203 has an electrophoretic device formed by the above manufacturing method.

Figure 5:
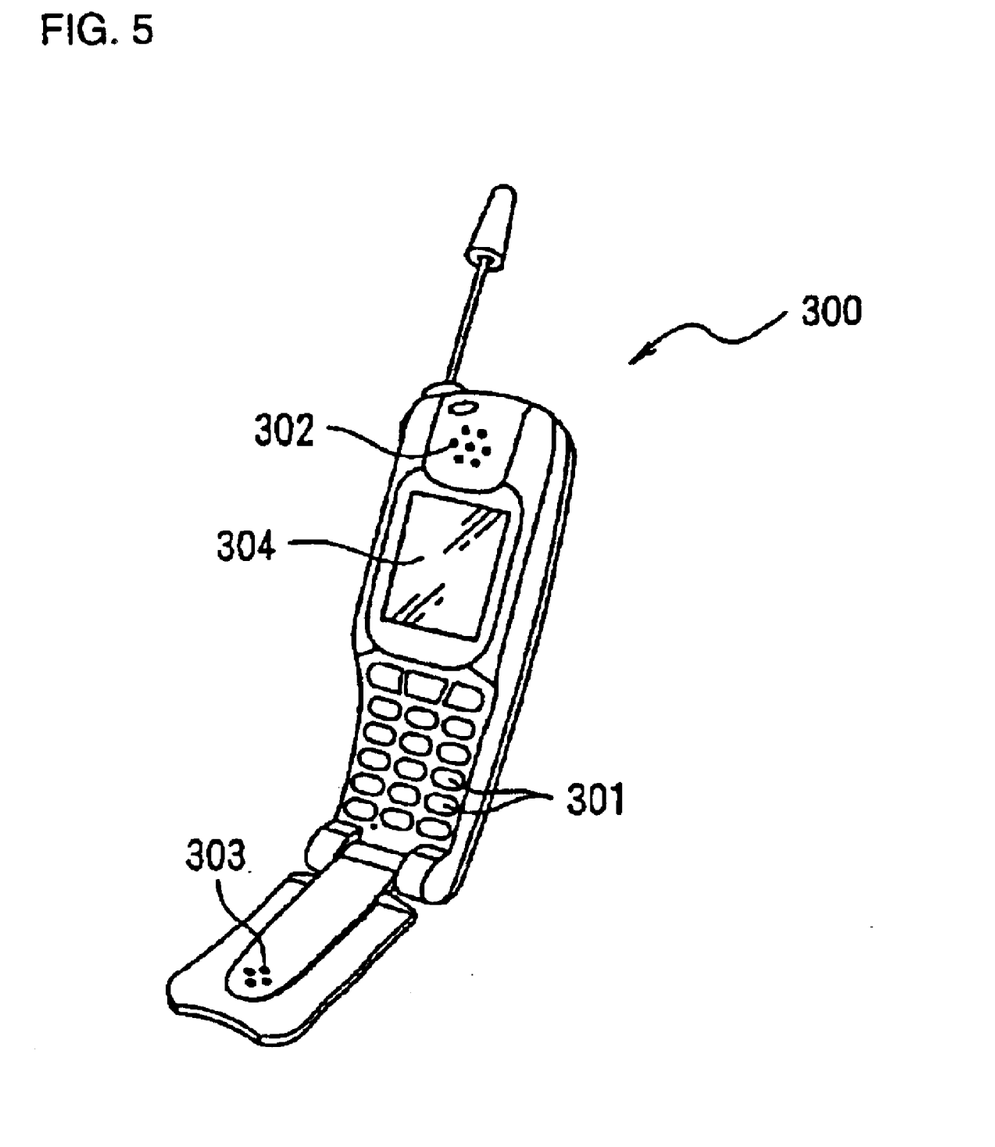
FIG. 5 is a perspective view showing a configuration of a cellular phone.

FIG. 5 is a perspective view showing a configuration of a cellular phone.

A cellular phone 300 has a plurality of operation buttons 301, a receiver 302, a transmitter 303, and a display panel 304. In the cellular phone 300, the display panel 304 has an electrophoretic device formed by the above manufacturing method.

Figure 6:
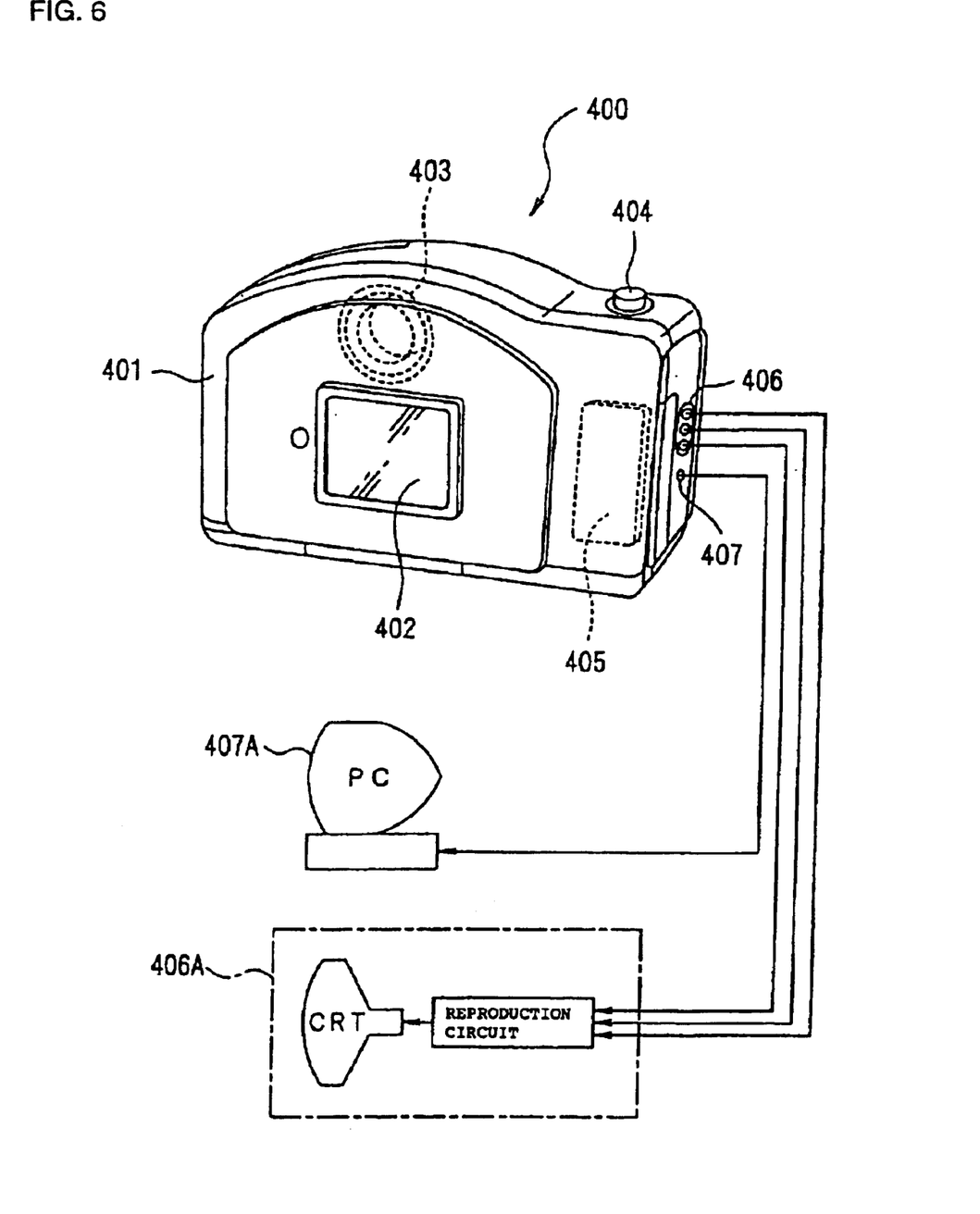
FIG. 6 is a perspective view showing a configuration of a digital still camera.

FIG. 6 is a perspective view showing a configuration of a digital still camera. Connected external devices are also simply shown.

A digital still camera 400 has a case 401, a display panel 402, a photoreceptor unit 403, a shutter button 404, and a circuit board 405, wherein the display panel 402 is placed at the rear of the case 401 and performs display according to image signals of a CCD (charge-coupled device), the photoreceptor unit 403 has a lens, the CCD, and the like placed at the side from which the case 401 is observed, the circuit board 405 stores transmitted image signals of the CCD when the shutter button 404 is pushed. In the digital still camera 400, the display panel 402 has an electrophoretic device formed by the above manufacturing method.

Video signal output terminals 406 and an input-output terminal 407 for data communication are provided at the side of the case 401 in digital still camera 400. A TV monitor 406A is connected to the former and a personal computer 407A is connected to the latter. According to predetermined operations, image signals stored in a memory of the circuit board 405 are output to the TV monitor 406A and the personal computer 407A.

Figure 7:
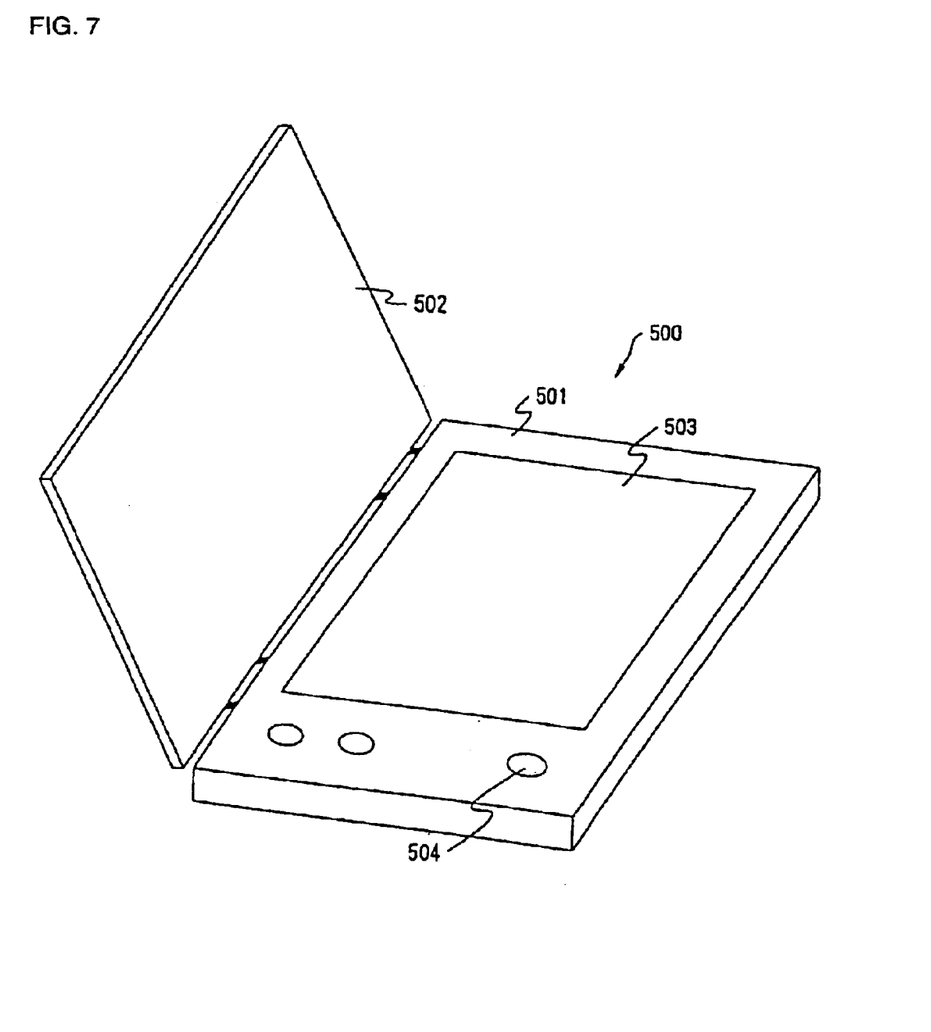
FIG. 7 is a perspective view showing a configuration of an electronic book.

FIG. 7 is a perspective view showing a configuration of an electronic book.

An electronic book 500 has a book-shaped frame 501 and a cover 502 for opening and closing the frame 501. On the frame 501, an operating portion 504 and a display 503 have an exposed display surface. In the electronic book 500, the display 503 has an electrophoretic device formed by the above manufacturing method.

Figure 8:
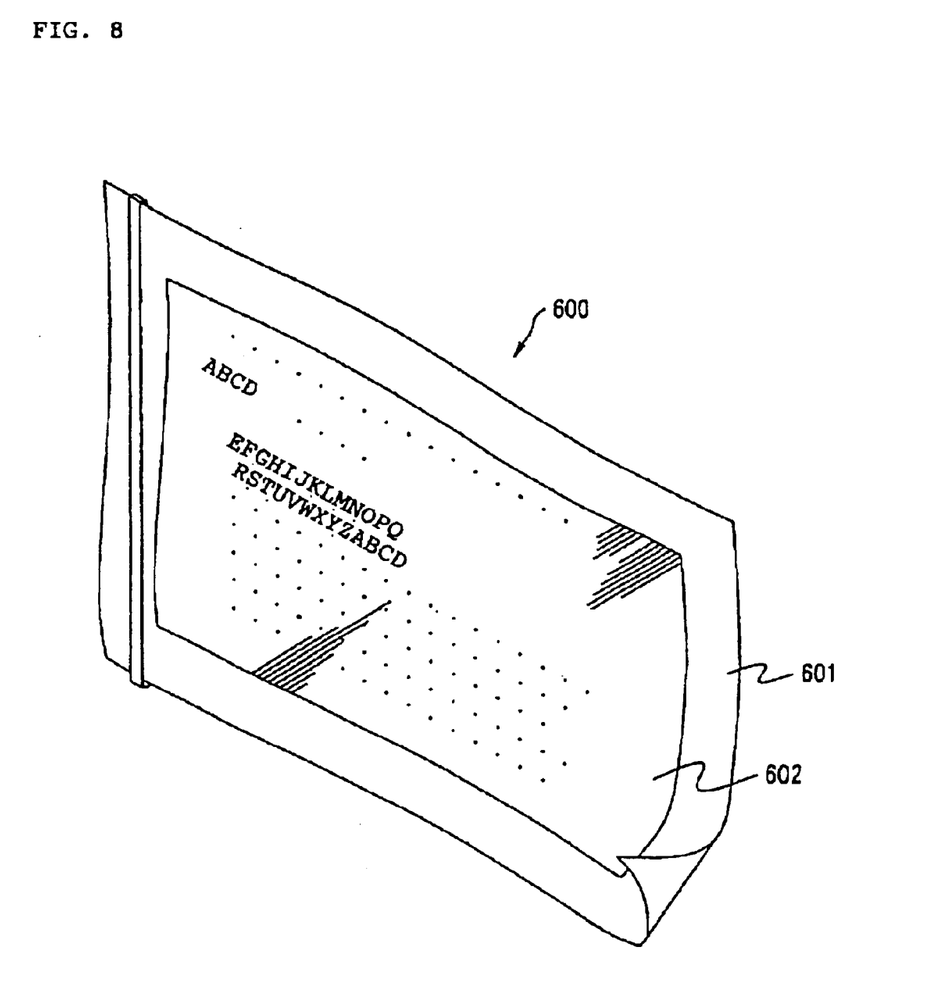
FIG. 8 is a perspective view showing a configuration of an electronic sheet.

FIG. 8 is a perspective view showing a configuration of an electronic sheet.

The electronic sheet 600 has a display unit 602 and a main body 601 having a rewritable sheet with the same texture and softness as paper. In the electronic sheet 600, the display unit 602 has an electrophoretic device formed by the above manufacturing method.

Figure 9:
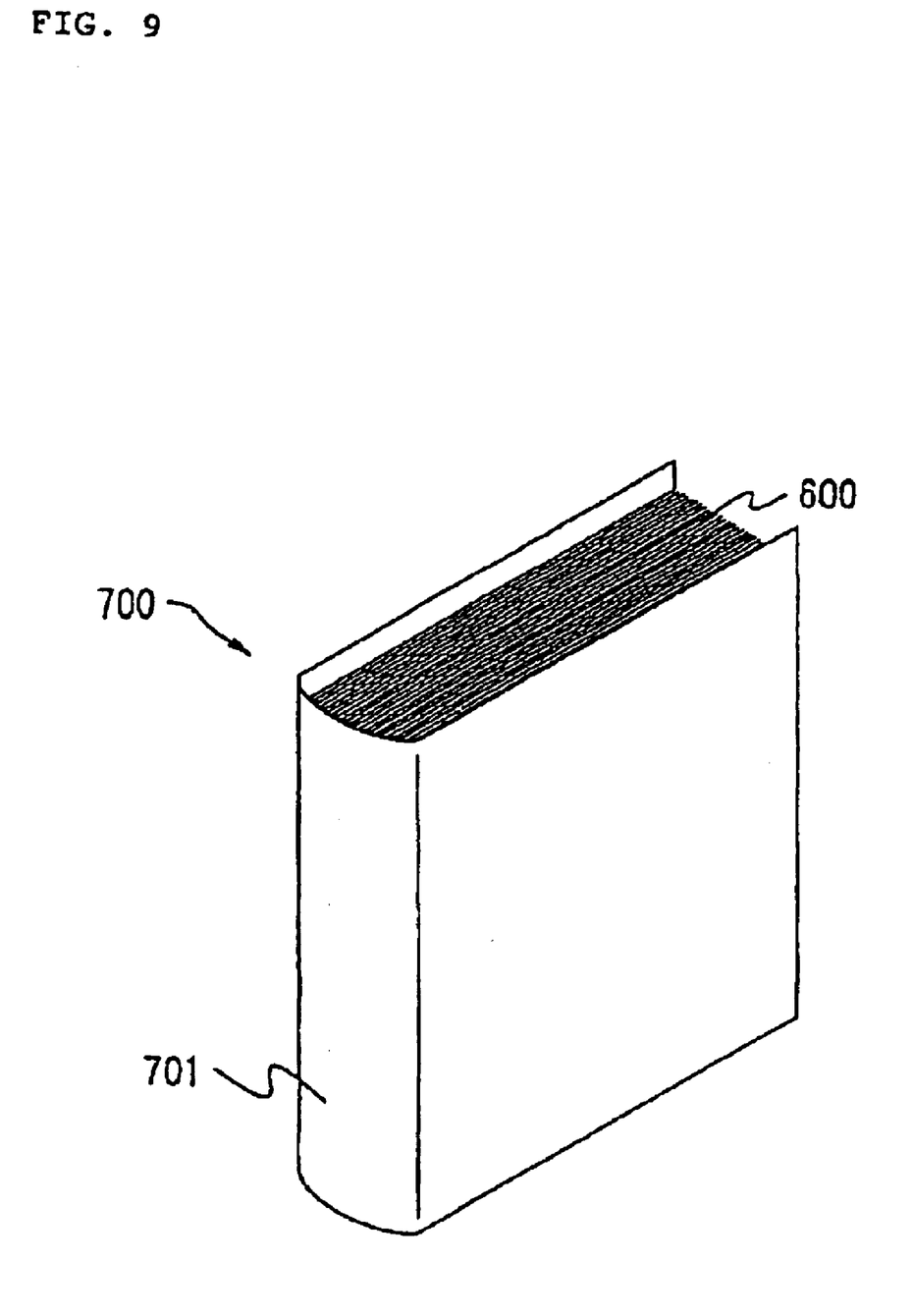
FIG. 9 is a perspective view showing a configuration of an electronic notepad.

FIG. 9 is a perspective view showing a configuration of an electronic sheet using the electronic sheet shown in FIG. 8.

An electronic notepad 700 has a cover 701 and the plurality of electronic sheets 600 surrounded by the cover 701. Using a display data input means provided to the cover 701, displayed contents of the electronic sheets 600, which are bound, can be changed. In the electronic notepad 700, the electronic sheets 600 have electrophoretic devices formed by the above manufacturing method.

Figure 10A:
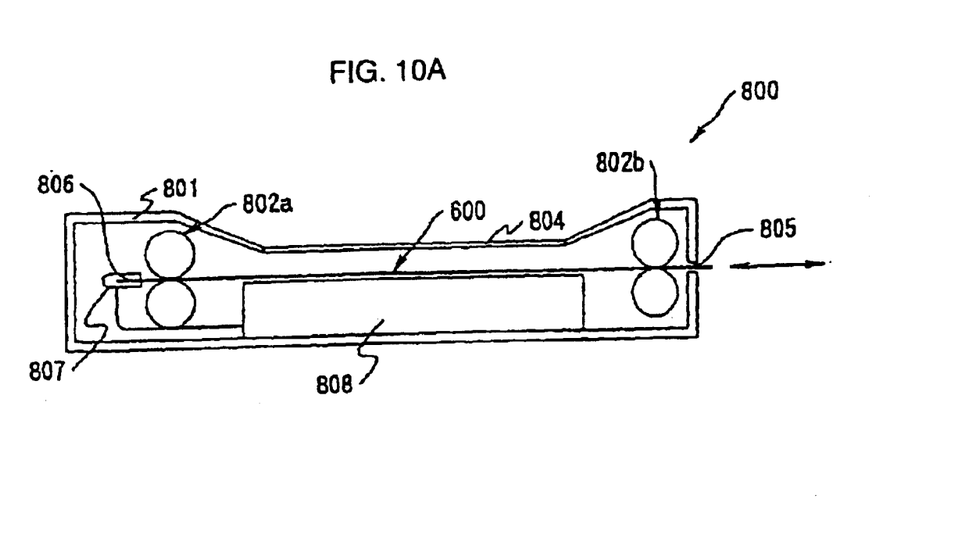
FIG. 10 is an illustration showing a configuration of an electrophoretic display having an electronic sheet, (a) is a sectional front elevation, and (b) is a plan view.
Figure 10B:
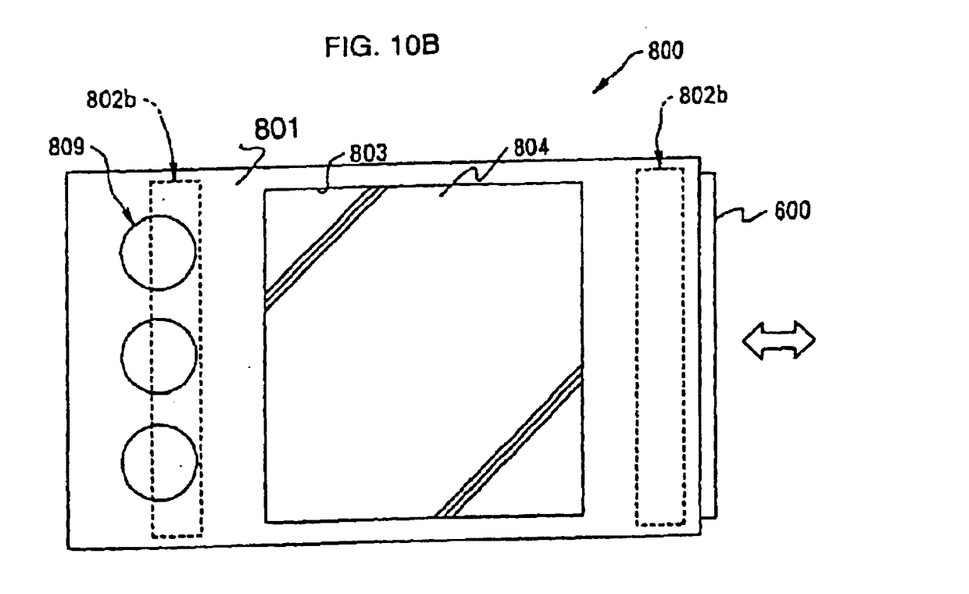

FIG. 10 is a perspective view showing another configuration of an electrophoretic display unit 800, FIG. 10(a) shows the sectional view, and FIG. 10(b) shows the plan view.

The electrophoretic display unit 800 has a main body 801, the electronic sheet 600, a transparent glass plate 804, an insertion slit 805, a controller 808, and an operation portion 809. The main body 801 has two pairs of conveying rollers 802a and 802b. The electronic sheet 600 sandwiched between the conveying rollers 802a and 802b is placed in the main body 801 and has a terminal portion 806 positioned at the tip in the inserting direction. A rectangular hole 803 is provided at the side of the display surface of the main body 801 and the transparent glass plate 804 is mounted to the rectangular hole 803. The insertion slit 805 is provided at an end of the main body 801 and is used for inserting the electronic sheet 600 in the main body 801 removably. The controller 808 is connectable to the terminal portion 806 through a socket 807. In the display unit 800, the electronic sheet 600 has an electrophoretic device formed by the above manufacturing method.

The display unit 800 has such a display surface that the electronic sheet 600 placed in the main body 801 is visible through the transparent glass plate 804. The electronic sheet 600 is removably placed in the main body 801 and may be portably used when removed from the main body 801.

The electronic devices are not limited to the above devices and include TVs, videotape recorders which are view-finder type or monitor direct-view type, car navigation systems, pagers, electronic notepads, portable calculators, word processors, workstations, videophones, POS terminals, and devices having a touch panel. An electrophoretic device formed by the above manufacturing method may be used for the displays of the above electronic devices.

Effects of the Invention

As described above, according to the first and second methods for manufacturing an electrophoretic device of the present invention, lyophobic layers having lyophobicity for a microcapsule dispersion in which microcapsules are dispersed are formed at desired regions of a member; and the microcapsule dispersion is applied onto the member having the lyophobic layers. Thus, the microcapsule dispersion applied onto the lyophobic layer migrates to another region not having the lyophobic layer; thereby achieving selective application of the microcapsule dispersion readily.

In order to use a region having the lyophobic layer as an electrical contact, the lyophobic layer on the region has such a thickness that conductivity is obtained; thereby using the lyophobic layer is used as an electrical contact.

According to the third method for manufacturing an electrophoretic device of the present invention, lyophilic layers having lyophilicity for a microcapsule dispersion in which microcapsules are dispersed are formed at desired regions of a member; and the microcapsule dispersion is applied onto the member having the lyophilic layers. Thus, the microcapsule dispersion applied onto a region not having the lyophilic layer gravitates toward the lyophilic layer; thereby achieving selective application of the microcapsule dispersion readily.

According to the fourth method for manufacturing an electrophoretic device of the present invention, the microcapsule dispersion contains a binder, thereby surely binding the microcapsule dispersion onto the member.

According to the fifth method for manufacturing an electrophoretic device of the present invention, a migration-promoting operation for promoting migration of the microcapsule dispersion on the member is performed while applying the microcapsule dispersion onto the member or after finishing applying; thereby achieving selective application of the microcapsule dispersion readily and improving the reliability.

According to the sixth to tenth methods for manufacturing an electrophoretic device of the present invention, the same effects as those of the first to fifth methods for manufacturing an electrophoretic device of the present invention are obtained.

The method for manufacturing an electronic device of the present invention provides the electronic device having the electrophoretic device in which the microcapsule dispersion is selectively applied readily, wherein the electrophoretic device is manufactured by the method for manufacturing an electrophoretic device of the present invention.

What is claimed is:

1. An electrophoretic device comprising:
   an electrophoretic layer including microcapsules containing an electrophoretic dispersion disposed between two electrodes;

lyophobic layers having lyophobicity for a microcapsule dispersion in which the microcapsules are dispersed at desired regions of a member; and said microcapsule dispersion being applied to the member having the lyophobic layers.

2. The electrophoretic device according to claim 1, wherein the lyophobic layer on a region used as an electrical contact among the regions has such a thickness that conductivity is obtained.

3. An electrophoretic device comprising:

an electrophoretic layer including microcapsules containing an electrophoretic dispersion is disposed between two electrodes;

lyophilic layers having lyophilicity for a microcapsule dispersion in which the microcapsules are dispersed at desired regions of a member; and the microcapsule dispersion being applied to the member having the lyophilic layers.

4. The electrophoretic device according to claim 3, wherein the microcapsule dispersion contains a binder.

5. The electrophoretic device according to claim 4, wherein a migration-promoting operation for promoting migration of the microcapsule dispersion on the member being performed while or after applying the microcapsule dispersion onto the member.

6. An electrophoretic device comprising:

electrophoretic particles contained in microcapsules that migrate in response to voltage applied from electrodes;

lyophobic layers having lyophobicity for a microcapsule dispersion in which the microcapsules are dispersed at desired regions of a member; and the microcapsule dispersion being applied to the member having the lyophobic layers.

7. The electrophoretic device according to claim 6, wherein the lyophobic layer on a region used as an electrical contact among the regions having such a thickness that conductivity is obtained.

8. An electrophoretic device comprising:

electrophoretic particles contained in microcapsules that migrate in response to voltage applied from electrodes;

lyophilic layers having lyophilicity for a microcapsule dispersion in which the microcapsules are dispersed at desired regions of a member; and the microcapsule dispersion being applied to the member having the lyophilic layers.

9. The electrophoretic device according to claim 8, wherein the microcapsule dispersion contains a binder.

10. The electrophoretic device according to claim 9, wherein a migration-promoting operation for promoting migration of the microcapsule dispersion on the member being performed while or after applying the microcapsule dispersion onto the member.

11. An electrophoretic device comprising:

a member that includes a first area with lyophobicity and a second area; and an electrophoretic layer including microcapsules containing a dispersion medium and particles, the electrophoretic layer being selectively arranged in the second area.

12. An electrophoretic device according to claim 11, wherein the first area on a region is used as an electrical contact among the regions having such a thickness that conductivity is obtained.

13. An electrophoretic device according to claim 11, wherein the dispersion medium contains a binder.

14. An electrophoretic device comprising:

a member that includes a first area and second area, the second area having with lyophilicity; and an electrophoretic layer including microcapsules containing a dispersion medium and particles, the electrophoretic layer being selectively arranged in the second area.

15. An electrophoretic device according to claim 14, wherein the dispersion medium contains a binder.

* * * * *